(12) United States Patent
Wakizaka et al.

(10) Patent No.: US 8,404,610 B2
(45) Date of Patent: Mar. 26, 2013

(54) PROCESS FOR PRODUCING FUEL CELL CATALYST, FUEL CELL CATALYST OBTAINED BY PRODUCTION PROCESS, AND USES THEREOF

(75) Inventors: Yasuaki Wakizaka, Chiba (JP); Ryuji Monden, Chiba (JP); Toshikazu Shishikura, Chiba (JP); Takuya Imai, Chiba (JP); Kenichiro Ota, Koganei (JP)

(73) Assignee: Showa Denko K.K., Tokyo (JP)

( * ) Notice: Subject to any disclaimer, the term of this patent is extended or adjusted under 35 U.S.C. 154(b) by 0 days.

(21) Appl. No.: 13/384,122

(22) PCT Filed: Jul. 14, 2010

(86) PCT No.: PCT/JP2010/061866
§ 371 (c)(1),
(2), (4) Date: Jan. 13, 2012

(87) PCT Pub. No.: WO2011/007790
PCT Pub. Date: Jan. 20, 2011

(65) Prior Publication Data
US 2012/0115064 A1 May 10, 2012

(30) Foreign Application Priority Data
Jul. 16, 2009 (JP) .................................. 2009-167635

(51) Int. Cl.
*H01M 4/88* (2006.01)
*H01M 4/02* (2006.01)
*H01M 4/36* (2006.01)
*H01M 8/10* (2006.01)

(52) U.S. Cl. ......... 502/101; 429/528; 429/523; 429/483

(58) Field of Classification Search .................. 502/101; 429/528, 523, 483
See application file for complete search history.

(56) References Cited

U.S. PATENT DOCUMENTS
5,766,788 A 6/1998 Inoue et al.
(Continued)

FOREIGN PATENT DOCUMENTS
JP 8-227716 A 9/1996
JP 2007-031781 A 2/2007
(Continued)

OTHER PUBLICATIONS

Doi et al., "Zirconium-Based Compounds for Cathode of Polymer Electrolyte Fuel Cell", Journal of the Electrochemical Society, 2007, vol. 154., No. 3, pp. B362-B369.
(Continued)

*Primary Examiner* — Helen O Conley
(74) *Attorney, Agent, or Firm* — Sughrue Mion, PLLC

(57) ABSTRACT

It is an object of the present invention to provide a production process which can produce a fuel cell catalyst having excellent durability and high oxygen reducing activity.

The process for producing a fuel cell catalyst including a metal-containing oxycarbonitride of the present invention includes a grinding step for grinding the oxycarbonitride using a ball mill, wherein the metal-containing oxycarbonitride is represented by a specific compositional formula; balls in the ball mill have a diameter of 0.1 to 1.0 mm; the grinding time using the ball mill is 1 to 45 minutes; the rotating centrifugal acceleration in grinding using the ball mill is 2 to 20 G; the grinding using the ball mill is carried out in such a state that the metal-containing oxycarbonitride is mixed with a solvent containing no oxygen atom in the molecule; and when the ball mill is a planetary ball mill, the orbital centrifugal acceleration mill is 5 to 50 G.

11 Claims, 4 Drawing Sheets

U.S. PATENT DOCUMENTS

| | | |
|---|---|---|
| 8,007,691 B2 | 8/2011 | Sawaki et al. |
| 2009/0202869 A1 | 8/2009 | Sawaki et al. |
| 2010/0227253 A1 | 9/2010 | Monden et al. |

FOREIGN PATENT DOCUMENTS

| | | |
|---|---|---|
| JP | 2007-257888 A | 10/2007 |
| JP | 2008-004286 A | 1/2008 |
| JP | 2008-108594 A | 5/2008 |
| JP | 2010-067509 A | 3/2010 |
| WO | WO 2009/031383 A1 | 3/2009 |

OTHER PUBLICATIONS

International Search Report of PCT/JP2010/061866 dated Sep. 28, 2010.

[Fig. 1]
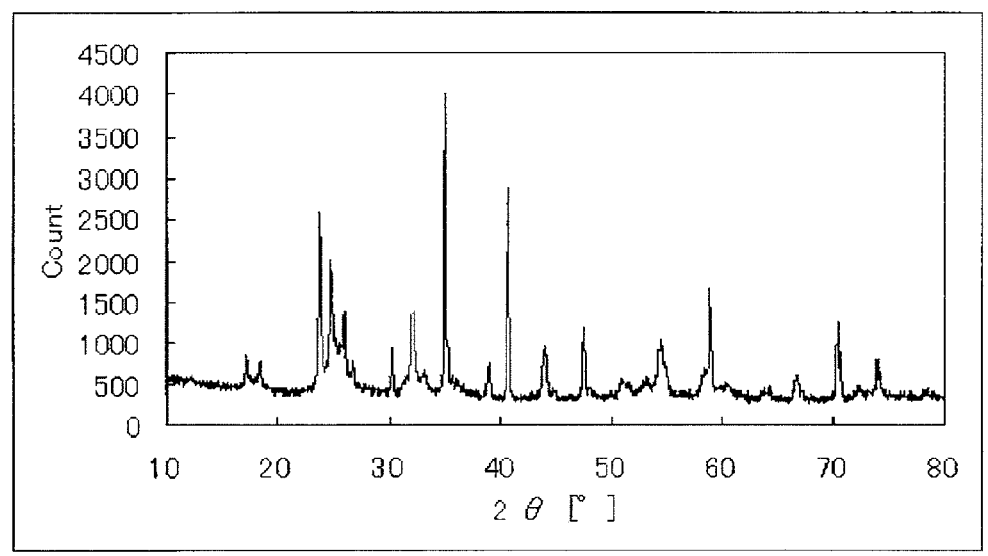
[Fig. 2]
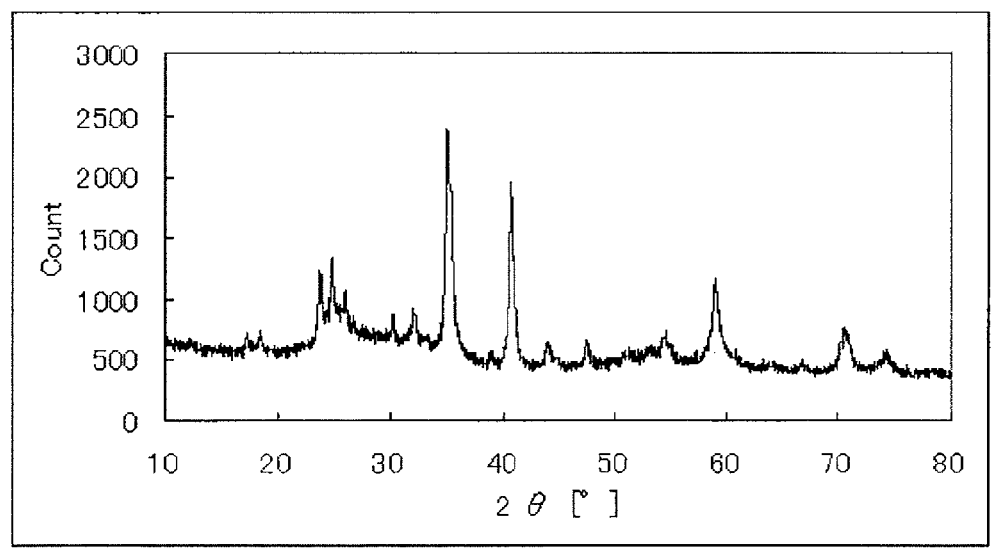

[Fig. 3]
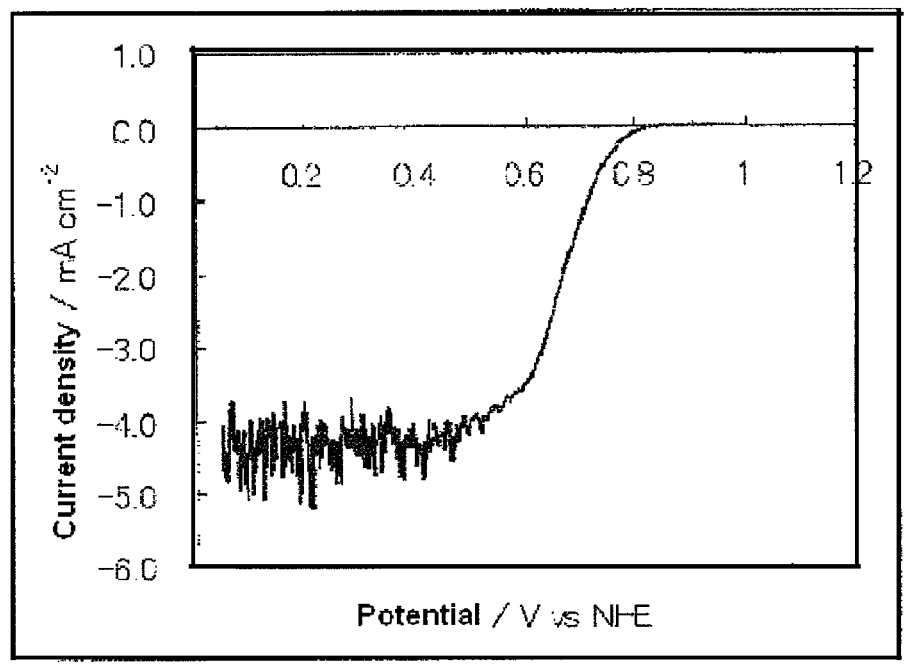
[Fig. 4]
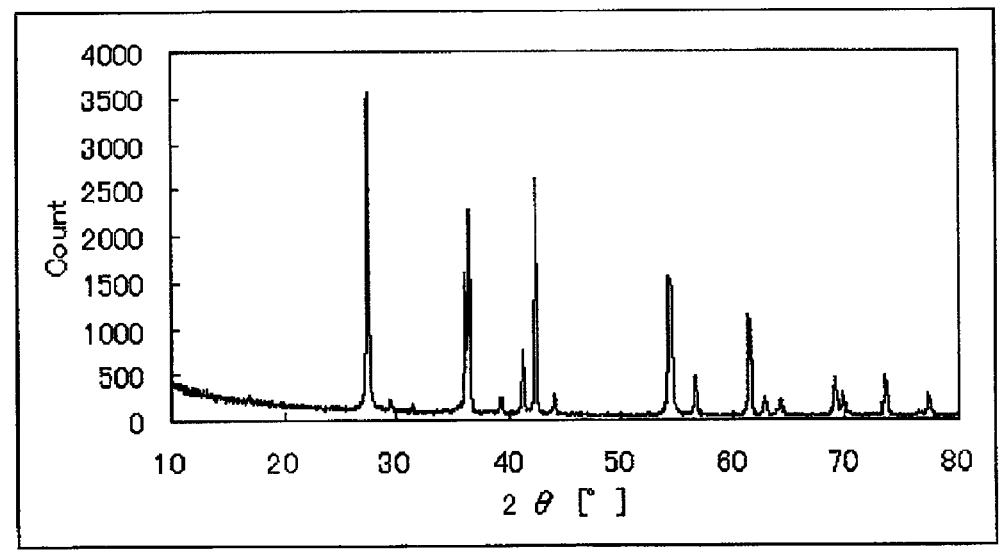

[Fig. 5]
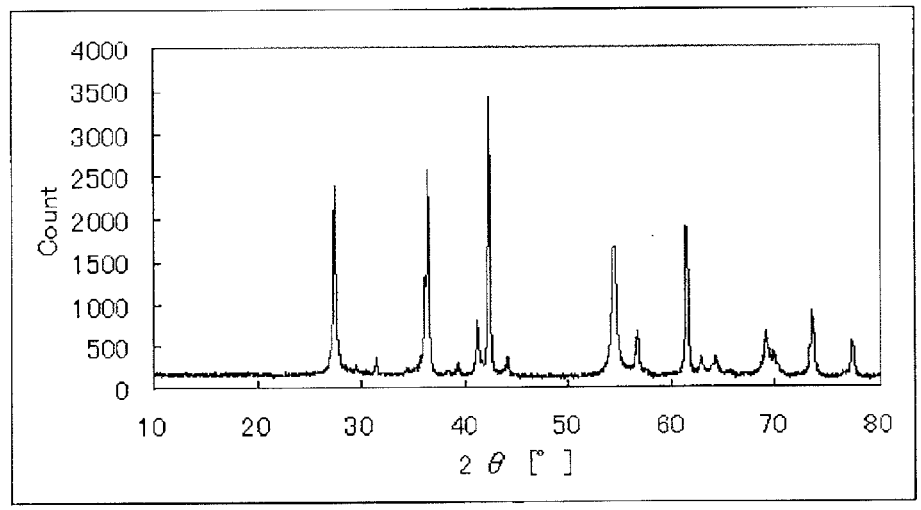
[Fig. 6]
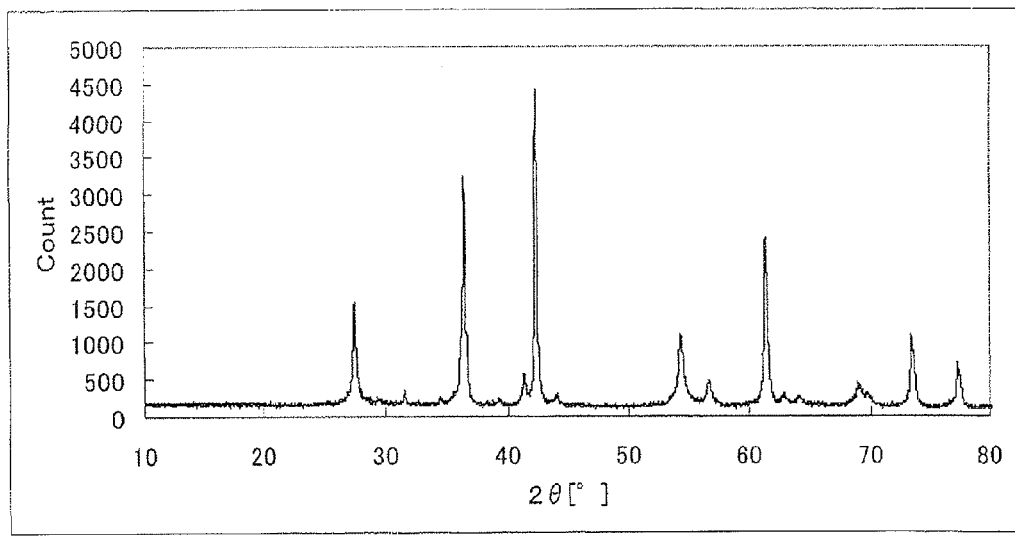

[Fig. 7]
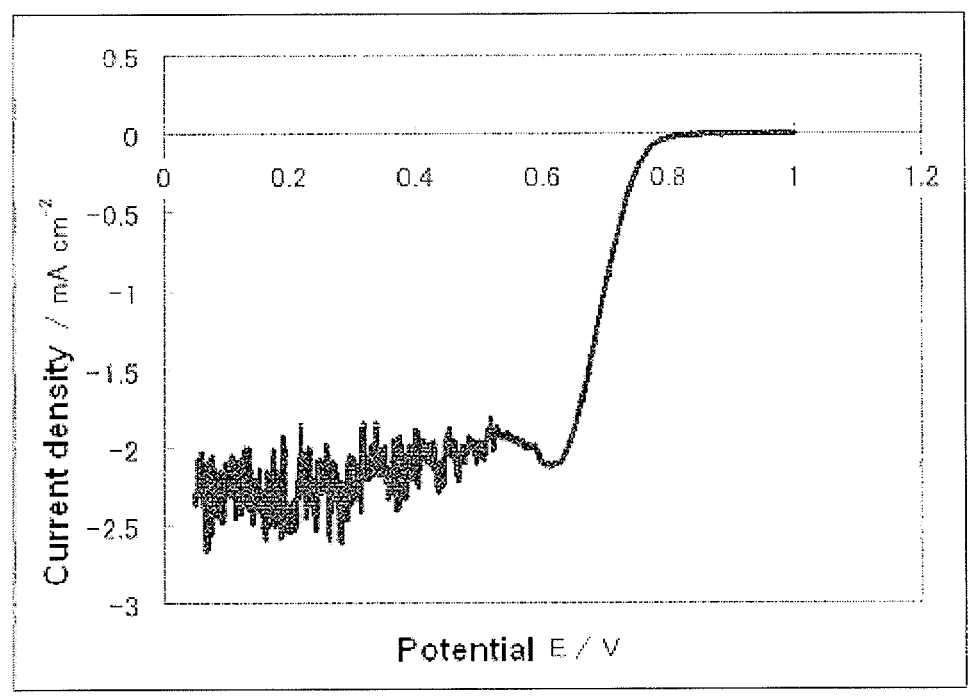

US 8,404,610 B2

PROCESS FOR PRODUCING FUEL CELL CATALYST, FUEL CELL CATALYST OBTAINED BY PRODUCTION PROCESS, AND USES THEREOF

FIELD OF THE PRESENT INVENTION

The present invention relates to a process for producing a fuel cell catalyst, a fuel cell catalyst obtained from the production process, and uses thereof.

BACKGROUND OF THE PRESENT INVENTION

Fuel cells are classified into several types according to electrolytes or electrodes. Typical types are alkaline types, phosphoric acid types, molten carbonate types, solid electrolyte types and polymer electrolyte types. In particular, polymer electrolyte fuel cells that can operate at temperatures ranging from low temperatures (about −40° C.) to about 120° C. attract attention and are progressively developed and practically used as power sources for low pollution automobiles. The polymer electrolyte fuel cells are expected to be used as automobile drive sources or stationary power sources. The use in these applications requires long-term durability.

The polymer electrolyte fuel cell has a solid polymer electrolyte sandwiched between an anode and a cathode. A fuel is fed to the anode, and oxygen or air is supplied to the cathode, whereby oxygen is reduced at the cathode to produce electricity. The fuel is usually hydrogen or methanol.

To increase the reaction rate in fuel cells and enhance the energy conversion efficiency, a layer containing a catalyst (hereinafter, also the fuel cell catalyst layer) is conventionally provided on the surface of a cathode (an air electrode) or an anode (a fuel electrode) of fuel cells.

Here, noble metals are generally used as the catalysts. Of the noble metals, platinum that is stable at high potential and has high catalytic activity is most frequently used. However, since platinum is expensive and exists in a limited amount, alternative catalysts have been desired. Further, the noble metals used on a cathode surface are often dissolved in an acidic atmosphere and are not suited in applications requiring long-term durability. Accordingly, it has been strongly demanded that catalysts are developed which are not corroded in an acidic atmosphere and have excellent durability and high oxygen reducing activity, and further is inexpensive in inexpensive in terms of electricity generation cost.

Further, the noble metals used on a cathode surface are often dissolved in an acidic atmosphere and are not suited in applications requiring long-term durability. Accordingly, it has been strongly demanded that catalysts are developed which are not corroded in an acidic atmosphere and have excellent durability and high oxygen reducing activity.

Materials containing nonmetals such as carbon, nitrogen and boron capture attention as alternative catalysts to platinum. The materials containing these nonmetals are inexpensive compared to noble metals such as platinum and are abundant.

Non-patent Document 1 reports that zirconium-based ZrOxN compounds show oxygen reducing activity.

Patent Document 1 discloses, as platinum-alternative materials, oxygen-reducing electrode materials containing a nitride of one or more elements selected from Groups 4, 5 and 14 in the long periodic table.

However, the materials containing these nonmetals do not provide sufficient oxygen reducing activity for practical use as catalysts.

Patent document 2 considers the possibility of providing a perovskite structure-having oxides which contain two or more kinds of metals as a platinum-alternative catalyst. As is clear from Example of this document, however, such a catalyst has limited effect of serving as a carrier to aid the platinum, and thus does not have a sufficient activity.

CITATION LIST

Patent Documents

Patent document 1: JP-A-2007-31781
Patent document 2: JP-A-2008-4286
Non-patent document 1: S. Doi, A. Ishihara, S. Mitsushima, N. Kamiya, and K. Ota, Journal of The Electrochemical Society, 154 (3) B362-B369 (2007)

SUMMARY OF THE PRESENT INVENTION

Problem to be Solved by the Invention

The present invention is aimed at solving the conventional problems in the art as described above. It is an object of the present invention to provide a production process which can produce a fuel cell catalyst having excellent durability and high oxygen reducing activity.

Means for Solving the Problem

The present inventors studied diligently to solve the conventional problems in the art. They have then found that grinding a metal-containing oxycarbonitride of a specific compositional formula under specific conditions dramatically increases the catalytic performance (oxygen reducing activity) of a fuel cell catalyst comprising the metal-containing oxycarbonitride. The present invention has been made based on this finding.

The present invention relates to the following matters (1) to (11), for example.

(1) A process for producing a fuel cell catalyst comprising a metal-containing oxycarbonitride, which process comprises a grinding step for grinding the metal-containing oxycarbonitride using a ball mill, wherein:

the metal-containing oxycarbonitride is represented by a compositional formula $MC_xN_yO_z$, wherein x, y, z are each a proportion of the number of atoms, $0.2 \leq x \leq 0.5$, $0.05 \leq y \leq 0.5$, and $0.5 \leq z \leq 1.7$, and M is a metal atom;

balls in the ball mill have a diameter of 0.1 to 1.0 mm;

the grinding time using the ball mill is 1 to 45 minutes;

the rotating centrifugal acceleration in grinding using the ball mill is 2 to 20 G;

the grinding using the ball mill is carried out in such a state that the metal-containing oxycarbonitride is mixed with a solvent containing no oxygen atom in the molecule; and when the ball mill is a planetary ball mill, the orbital centrifugal acceleration is 5 to 50 G.

(2) The production process as described in (1), wherein the solvent containing no oxygen atom in the molecule is at least one solvent selected from the group consisting of acetonitrile, dichloroethane, n-hexane and cyclohexane.

(3) The production process as described in (1) or (2), wherein M is at least one kind selected from the group consisting of niobium, iron, titanium, lanthanum, tantalum, and zirconium.

(4) The production process as described in any of (1) to (3), wherein the metal-containing oxycarbonitride is obtained by heating a metal-containing carbonitride in an inert gas containing an oxygen gas.

(5) A fuel cell catalyst obtainable by the production process as described in any one of (1) to (4).

(6) A fuel cell catalyst layer comprising the fuel cell catalyst as described in (5).

(7) The fuel cell catalyst layer as described in (6), which further comprises electron conductive particles.

(8) An electrode comprising a fuel cell catalyst layer and a porous support layer, wherein the fuel cell catalyst layer is the fuel cell catalyst layer as described in (6) or (7).

(9) A membrane electrode assembly comprising a cathode, an anode and an electrolyte membrane interposed between the cathode and the anode, wherein the cathode and/or the anode is the electrode as described in (8).

(10) A fuel cell comprising the membrane electrode assembly as described in (9).

(11) A polymer electrolyte fuel cell comprising the membrane electrode assembly as described in (9).

Advantageous Effects of the Present Invention

The fuel cell catalyst obtainable from the production process of the present invention is not corroded in acidic electrolytes or at high potential and thus has stability, has high oxygen reducing activity and is inexpensive compared to platinum. A fuel cell having the above catalyst is therefore relatively inexpensive and has excellent performance.

BRIEF DESCRIPTION OF THE DRAWINGS

FIG. 1 is a powder X-ray diffraction spectrum of a catalyst material before grinding (1) of Example 1.

FIG. 2 is a powder X-ray diffraction spectrum of a catalyst (1) of Example 1.

FIG. 3 is a graph evaluating the oxygen reducing activity of a catalyst (1) of Example 1.

FIG. 4 is a powder X-ray diffraction spectrum of a catalyst material before grinding (4) of Example 6.

FIG. 5 is a powder X-ray diffraction spectrum of a catalyst (6) of Example 6.

FIG. 6 is a powder X-ray diffraction spectrum of a catalyst (10) of Example 10.

FIG. 7 is a graph evaluating the oxygen reducing activity of a catalyst (10) of Example 10.

EMBODIMENTS FOR CARRYING OUT THE INVENTION

<Process for Producing Fuel Cell Catalyst>

The production process of the present invention relates to a process for producing a fuel cell catalyst comprising a metal-containing oxycarbonitride, which process comprises a step for grinding a metal-containing oxycarbonitride of a specific compositional formula using a ball mill under specific conditions. By the inclusion of the grinding step, the catalytic performance (oxygen reducing activity) of the fuel cell catalyst comprising the metal-containing oxycarbonitride can be dramatically increased.

The compositional formula of the metal-containing oxycarbonitride is represented by $MC_xN_yO_z$, wherein x, y, z are each a proportion of the number of atoms, $0.2 \leq x \leq 0.5$, $0.05 \leq y \leq 0.5$, and $0.5 \leq z \leq 1.7$, and M is a metal atom.

In the compositional formula, preferably the following is satisfied: $0.22 \leq x \leq 0.48$, $0.07 \leq y \leq 0.45$, and $0.6 \leq z \leq 1.65$, and more preferably the following is satisfied: $0.23 \leq x \leq 0.46$, $0.09 \leq y \leq 0.42$, and $0.6 \leq z \leq 1.6$.

In the compositional formula, M is preferably one kind selected from the group consisting of niobium, iron, titanium, lanthanum, tantalum, zirconium, hafnium, vanadium, molybdenum, chromium, tungsten, cobalt, nickel, and copper; more preferably one kind selected from the group consisting of niobium, iron, titanium, lanthanum, tantalum, zirconium, hafnium, and vanadium; still more preferably one kind selected from the group consisting of niobium, iron, titanium, lanthanum, tantalum, and zirconium; particularly preferably one kind selected from the group consisting of niobium, iron, titanium, lanthanum, and zirconium; extremely preferably one kind selected from the group consisting of niobium, iron, titanium, and lanthanum.

The use of the metal-containing oxycarbonitride represented by the above formula as a catalyst material before grinding (hereinafter, also referred to as a "catalyst material before grinding") provides a fuel cell catalyst obtained after grinding with high catalytic performance (oxygen reducing activity). If the proportions of the numbers of the individual atoms are outside the above ranges, the catalytic performance of a fuel cell catalyst obtained after grinding tends to be lower.

With respect to grinding using a ball mill, at first, grinding using a planetary ball mill is described.

In the grinding using the planetary ball mill, by orbiting a rotating cylinder mill around an axis separately provided parallel to the rotating axis of the rotating cylinder mill, a planetary movement is applied to a mixture and balls in the mill container, and thereby rotating and orbital centrifugal accelerations are applied to the mixture and the balls in the mill container. As a result, the metal-containing oxycarbonitride (catalyst material before grinding) is finely ground by impact force generated when the metal-containing oxycarbonitride (catalyst material before grinding) collides with the balls and by shear force generated when the metal-containing oxycarbonitride (catalyst material before grinding) goes through the balls.

The production process of the present invention can be achieved also by employing a batch type ball mill, e.g., a pot type ball mill, or a continuous type ball mill, when an appropriate rotating gravitational acceleration is set. For example, the metal-containing oxycarbonitride may be ground by employing a tabletop type ball mill stand and a plastic-made sealed container. A preferable sealed container is made of polyethylene or polypropylene because sealed containers made of such materials have excellent chemical resistance against a dispersion solvent used in grinding.

The number of rotating revolution in grinding is preferably about 30 to 2000 rpm. In a more preferable embodiment, the number of rotating revolution in grinding is not less than 50 rpm in view of shortening the grinding time. In another more preferable embodiment, the number of rotating revolution in grinding is not more than 1000 rpm in view of reducing damage to the surface of the catalyst and preventing the resultant catalyst from having lowered activity.

The difference in the diameter of a pot to be employed leads to the difference in the appropriate number of the revolution. The acceleration generated by rotation of not less than 2 G can shorten the grinding time, leading to an industrial advantage, while the acceleration of not more than 20 G reduces the damage of the surface of the catalyst, leading to the provision of a catalyst with high activity.

In the present invention, the grinding may be carried out using a ball mill such that a solvent in which the metal-containing oxycarbonitride slurry is dispersed is circulated through the mill, i.e., a continuous type ball mill exemplified by a grain mill manufactured by Asada Iron Works Co., Ltd. The grinding time using the ball mill refers to a time during which the metal-containing oxycarbonitride is substantially present in a mill grinding chamber of the ball mill. Thus, when the slurry of the metal-containing oxycarbonitride is circulated through the entire mill in a volume twice as much as the capacity of the mill grinding chamber, "the grinding time using the ball mill" is half of the time during which the mill is actually operated; and when the slurry of the metal-containing oxycarbonitride is circulated through the entire mill in a volume three times as much as the capacity of the mill grinding chamber, "the grinding time using the ball mill" is one third of the time during which the mill is actually operated.

In the production process of the present invention, the ball in the ball mill has a diameter of 0.1 to 1.0 mm, preferably 0.2 to 0.5 mm, more preferably 0.3 to 0.5 mm. The use of the ball having a diameter within such a range provides a fuel cell catalyst obtained after grinding with high catalytic performance (oxygen reducing activity). The use of the ball having a diameter smaller than the above range tends to lower the catalytic performance of a fuel cell catalyst obtained after grinding.

Examples of a material of the ball in the ball mill include zirconia, glass and alumina. A preferable material of the ball is zirconia, which has a high abrasion resistance.

The amount of the ball to be added to the ball mill is preferably 20 to 60 times as much as the mass of the metal-containing oxycarbonitride (catalyst material before grinding) to be introduced into the mill container. If this addition amount is less than 20 times or more than 60 times, the efficiency of grinding the metal-containing oxycarbonitride (catalyst material before grinding) may be lowered.

The grinding time using the ball mill is 1 to 45 min, preferably 2 to 35 min, more preferably 3 to 25 min. When the grinding time using the ball mill is within the above range, a fuel cell catalyst obtained after grinding is provided with high catalytic performance (oxygen reducing activity). If the grinding time using the ball mill is longer than the above range, the catalytic performance of a fuel cell catalyst obtained after grinding tends to be lower.

The rotating centrifugal acceleration in grinding using the ball mill is 2 to 20 G, preferably 4 to 18 G, more preferably 6 to 16 G. When the rotating centrifugal acceleration in grinding using the ball mill is within the above range, a fuel cell catalyst obtained after grinding is provided with high catalytic performance (oxygen reducing activity). If the rotating centrifugal acceleration in grinding using the ball mill is larger than the above range, the catalytic performance of a fuel cell catalyst obtained after grinding tends to be lower.

In the present invention, the rotating centrifugal acceleration in grinding using the ball mill is determined from the following relation.

Rotating centrifugal acceleration (unit: gravitational acceleration G)$=1118 \times R_1 \times N_1^2 \times 10^{-8}$, wherein $R_1$ is a rotation radius (cm) and $N_1$ is the number of rotation revolution (rpm).

When the ball mill is a planetary ball mill, the orbital centrifugal acceleration in grinding using the planetary ball mill is 5 to 50 G, preferably 8 to 45 G, more preferably 10 to 35 G. When the orbital centrifugal acceleration in grinding using the planetary ball mill is within the above range, a fuel cell catalyst obtained after grinding is provided with high catalytic performance (oxygen reducing activity). If the orbital centrifugal acceleration in grinding using the planetary ball mill is larger than the above range, the catalytic performance of a fuel cell catalyst obtained after grinding tends to be lower.

In the present invention, the orbital centrifugal acceleration in grinding using the planetary ball mill is determined from the following relation.

Orbital centrifugal acceleration (unit: gravitational acceleration G)$=1118 \times R_2 \times N_2^2 \times 10^{-8}$, wherein $R_2$ is an orbital radius (cm) and $N_2$ is the number of orbital revolution (rpm).

The grinding using the ball mill is carried out in such a state that the metal-containing oxycarbonitride is mixed with a solvent containing no oxygen atom in the molecule. When the grinding using the ball mill is carried out in such a state, a fuel cell catalyst obtained after grinding is provided with high catalytic performance (oxygen reducing activity).

The mixing ratio of the metal-containing oxycarbonitride to the solvent containing no oxygen atom in the molecule (the mass of the metal-containing oxycarbonitride:the mass of the solvent containing no oxygen atom in the molecule) is preferably 1:1 to 1:50, more preferably 1:3 to 1:20, still more preferably 1:6 to 1:9.

The solvent containing no oxygen atom in the molecule is preferably at least one solvent selected from the group consisting of acetonitrile, dichloroethane, n-hexane and cyclohexane; more preferably at least one solvent selected from the group consisting of acetonitrile and dichloroethane; particularly preferably acetonitrile or dichloroethane. The use of the solvent containing no oxygen atom in the molecule provides a fuel cell catalyst obtained after grinding with high catalytic performance (oxygen reducing activity). The use of a solvent containing an oxygen atom in the molecule, e.g., water and ethanol, tends to lower the catalytic performance of a fuel cell catalyst obtained after grinding. The solvent containing no oxygen atom in the molecule preferably does not contain water and dissolved oxygen. The concentration of water in the solvent containing no oxygen atom in the molecule is preferably not more than 5000 ppm by weight, more preferably 1000 ppm by weight. The amount of dissolved oxygen in the solvent containing no oxygen atom in the molecule is preferably not more than 50 ppm by weight, more preferably 25 ppm by weight.

It is preferable that the solvent containing no oxygen atom in the molecule is added to a mill container in such a manner as to fill 10 to 20% of the entire mill container if the metal-containing oxycarbonitride and the balls have been introduced therein.

The grinding using the ball mill is preferably carried out substantially in the absence of oxygen. The substantial absence of oxygen can be created by, for example, sufficiently replacing the inside of the mill container with an inert gas such as argon. After the replacing, oxygen in an amount regarded as an impurity amount may be contained.

The grinding using the ball mill is usually carried out at normal temperature and under normal pressure, but can be carried out at controlled temperature and under controlled pressure as needed.

A method for obtaining the metal-containing oxycarbonitride (catalyst material before grinding) is not particularly limited, but for example, a method can be mentioned to heat a metal-containing carbonitride in an inert gas containing an oxygen gas. A metal constituting the metal-containing oxycarbonitride is at least one kind selected from the group consisting of niobium, iron, titanium, lanthanum, tantalum, zirconium, hafnium, vanadium, molybdenum, chromium, tungsten, cobalt, nickel, and copper; more preferably at least one kind selected from the group consisting of niobium, iron, titanium, lanthanum, tantalum, zirconium, hafnium, and vanadium; still more preferably at least one kind selected from the group consisting of niobium, iron, titanium, lanthanum, tantalum, and zirconium; particularly preferably one kind selected from the group consisting of niobium, iron, titanium, lanthanum, and zirconium; extremely preferably one kind selected from the group consisting of niobium, iron, titanium, and lanthanum.

Hereinafter, the method to heat the metal-containing carbonitride in an inert gas containing an oxygen gas is described.

Examples of the inert gases include nitrogen gas, helium gas, neon gas, argon gas, krypton gas, xenon gas and radon gas. Nitrogen gas or argon gas is particularly preferable because of their relatively high availability.

The concentration of the oxygen gas to be contained in the inert gas depends on the heating time and the heating temperature, but is preferably in the range of 0.1 to 10% by volume, particularly preferably 0.1 to 5% by volume. The oxygen gas concentration in this range is preferable, resulting in the formation of a uniform oxycarbonitride. If the oxygen gas concentration is less than 0.1% by volume, the oxidation tends to fail.

The heating temperature is preferably in the range of 400 to 1400° C. The heating temperature in this range is preferable, resulting in the formation of a uniform oxycarbonitride. The heating temperature of less than 400° C. tends to prevent the oxidation from proceeding.

The inert gas may contain a hydrogen gas. The concentration of the hydrogen gas depends on the heating time and the heating temperature, but is preferably in the range of 0.1 to 10% by volume. The hydrogen gas concentration in the range of 0.5 to 5% by volume is particularly preferable, resulting in the formation of a uniform oxycarbonitride. The hydrogen gas concentration of more than 10% by volume tends to make the reduction proceed excessively.

In the present invention, the value of the gas concentration (% by volume) is a value in terms of the standard condition.

Examples of the heating method include a standing method, a stirring method, a dropping method and a powder capturing method.

Under the standing method, a metal-containing carbonitride placed in a stationary electric furnace or the like is heated. In another way of this method, an alumina board, a quarts board or the like on which the metal-containing carbonitride has been weighed is placed and heated. The standing method is preferable in terms of being able to heat a large amount of a metal-containing carbonitride.

Under the stirring method, a metal-containing carbonitride introduced into an electric furnace such as a rotary kiln is heated while being stirred. The stirring method is preferable in terms of being able to heat a large amount of a metal-containing carbonitride, and also in terms of being able to prevent the aggregation and growth of the particles of the metal-containing carbonitride.

In the case where the standing method or the stirring method is carried out using a tubular furnace, the time for heating the metal-containing carbonitride is from 0.1 to 10 hours, and preferably from 0.5 to 5 hours. The heating time in this range is preferable, leading to the tendency of the formation of a uniform oxycarbonitride. The heating time of less than 0.1 hour tends to lead to partial formation of an oxycarbonitride. The heating time of more than 10 hours tends to make the oxidation proceed excessively.

Under the dropping method, an induction furnace is heated to a predetermined heating temperature while flowing an inert gas containing a trace amount of an oxygen gas through the furnace; a thermal equilibrium is maintained at the temperature; and the metal-containing carbonitride is dropped and heated in a crucible which is a heating zone in the furnace. The dropping method is preferable in terms of being able to minimizing the aggregation and growth of particles of the metal-containing carbonitride.

Under the dropping method, the time for heating the metal-containing carbonitride is usually from 0.5 to 10 minutes, and preferably from 0.5 to 3 minutes. The heating time within this range is preferable, leading to the tendency of the formation of a uniform oxycarbonitride. The heating of less than 0.5 minute tends to lead to partial formation of an oxycarbonitride. The heating time of more than 10 minutes tends to make the oxidation proceed excessively.

Under the powder capturing method, niobium carbonitride is caused to suspend as particles in an inert gas atmosphere containing a trace amount of an oxygen gas, and the metal-containing carbonitride is captured and heated in a vertical tubular furnace controlled at a predetermined heating temperature.

In the powder capturing method, the time for heating the metal-containing carbonitride is from 0.2 second to 1 minute, and preferably from 0.2 to 10 seconds. The heating time within this range is preferable, leading to the tendency of the formation of a uniform oxycarbonitride. The heating of less than 0.2 second tends to lead to partial formation of an oxycarbonitride. The heating time of more than 1 minute tends to make the oxidation proceed excessively.

In a preferable embodiment of the production process of the present invention, the step of heating the metal-containing carbonitride in the inert gas containing an oxygen gas, as described above, is followed by the step of grinding the resultant sintered product (the metal-containing oxycarbonitride) using a ball mill such as a planetary ball mill under specific conditions thereby producing a catalyst.

A method for obtaining the metal-containing carbonitride is not particularly limited and includes, for example, a method for heating a mixture of the metal-containing compound, a raw material serving as a carbon source and a raw material serving as a nitrogen source.

<Fuel Cell Catalyst>

The fuel cell catalyst of the present invention can be obtained by the production process as described above.

The BET specific surface area of the fuel cell catalyst of the present invention is preferably 5 $m^2/g$ or more, more preferably 8 to 500 $m^2/g$, particularly preferably 10 to 150 $m^2/g$. The value of the BET specific surface area in the present invention is measurable using a commercially available BET measurement equipment, with examples thereof including Micromeritics Gemini 2360 manufactured by Shimadzu Corporation. The average particle diameter can be determined from the following relation, using a specific surface area obtained by BET method.

Average particle diameter(nm)=6000/((Specific surface area($m^2/g$))×True specific gravity($g/cm^3$))

The fuel cell catalyst of the present invention preferably has an oxygen reduction onset potential as measured in accordance with the following measurement method (A) of 0.5 V (vs. NHE) or more on the basis of a reversible hydrogen electrode.

[Measurement Method (A):

The catalyst dispersed in carbon, which is an electron conductive substance, is added to a solvent so that the catalyst and the carbon account for 1% by mass. The mixture is ultrasonically stirred to give a suspension. The carbon herein is carbon black (specific surface area: 100 to 300 $m^2/g$) (e.g., XC-72 manufactured by Cabot Corporation), and the catalyst is dispersed therein with a catalyst:carbon mass ratio of 95:5. The solvent is a mixture of isopropyl alcohol:water (mass ratio)=2:1.

While ultrasonicating the suspension, a 10 μl portion thereof is collected and is quickly dropped on a glassy carbon electrode (diameter: 5.2 mm) and dried under 120° C. for 5 minutes to form a fuel cell catalyst layer containing the catalyst on the glassy carbon electrode. This dropping and drying procedure is repeated until 1.0 mg or more of the fuel cell catalyst layer is formed on the carbon electrode surface.

Subsequently, 10 μl of NAFION (registered trade mark) (a 5% NAFION (registered trade mark) solution (DE521) manufactured by DuPont) diluted ten times with isopropyl alcohol is dropped on the fuel cell catalyst layer and is dried at 120° C. for 1 hour.

The electrode thus obtained is polarized in a 0.5 mol/L sulfuric acid aqueous solution at 30° C. under an oxygen atmosphere and a nitrogen atmosphere at a potential scanning rate of 5 mV/sec, thereby measuring a current-potential curve. As a reference, a reversible hydrogen electrode is polarized in a sulfuric acid aqueous solution of the same concentration. In the current-potential curve, the potential at which the reduction current starts to differ by 0.5 μA/cm$^2$ or more between the polarization under the oxygen atmosphere and that under the nitrogen atmosphere is defined as the oxygen reduction onset potential.]

If the oxygen reduction onset potential is less than 0.7 V (vs. NHE), the use of the catalyst in a fuel cell cathode may cause the generation of hydrogen peroxide. For the oxygen reduction, the oxygen reduction onset potential is preferably 0.85 V (vs. NHE) or more. A higher oxygen reduction onset potential is preferable. The upper limit of the oxygen reduction onset potential is not particularly limited but is theoretically 1.23 V (vs. NHE).

The oxygen reduction current density of the fuel cell catalyst of the present invention is, at 0.70 V (vs. NHE), preferably not less than 0.1 mA/cm$^2$, more preferably not less than 0.2 mA/cm$^2$, most preferably not less than 0.5 mA/cm$^2$. The upper limit of the oxygen reduction current density is not particularly limited but is 100 mA/cm$^2$.

In the present invention, the oxygen reduction current density can be determined in such a manner as described below.

At first, from the result of the measurement method (A), a difference between the reduction current under oxygen atmosphere and the reduction current under nitrogen atmosphere at 0.7 V (vs. NHE) is calculated. The calculated value is divided by an area of the electrode to provide a value and this value is defined as an oxygen reduction current density (mA/cm$^2$).

The fuel cell catalyst layer of the invention that is prepared using the above catalyst is preferably used at a potential of not less than 0.4 V (vs. NHE) in an acidic electrolyte. The upper limit of the potential depends on the stability of the electrode. The electrode according to the invention may be used at as high a potential as about 1.23 V (vs. NHE) which is the oxygen generation potential.

At a potential of less than 0.4V (vs. NHE), the compound can exist stably but oxygen cannot be reduced sufficiently. Catalysts having such a low potential are not useful as fuel cell catalyst layers in membrane electrode assemblies for fuel cells.

The fuel cell catalyst of the present invention can be effectively used as a catalyst alternative to a platinum catalyst.

The fuel cell catalyst layer of the present invention comprises the above fuel cell catalyst.

The fuel cell catalyst layers may be anode catalyst layers or cathode catalyst layers, and the fuel cell catalysts of the present invention may be used in any of these layers. Because the fuel cell catalysts have excellent durability and high oxygen reducing activity, they are preferably used in cathode catalyst layers.

In a preferred embodiment, the fuel cell catalyst layer further contains electron conductive particles. When the fuel cell catalyst layer containing the fuel cell catalyst further contains electron conductive particles, the reduction current can be increased, probably because the electron conductive particles establish electrical contacts with the fuel cell catalyst to induce electrochemical reaction.

The electron conductive particles are generally used as a support for the catalyst.

Examples of materials constituting the electron conductive particles include carbons, conductive polymers, conductive ceramics, metals and conductive inorganic oxides such as tungsten oxide and iridium oxide. These materials can be used singly or in combination with one another. In particular, carbon particles having a large specific surface area or a mixture of carbon particles having a large specific surface area and other electron conductive particles is preferable. That is, the fuel cell catalyst layer according to a preferred embodiment comprises the above catalyst and carbon particles having a large specific surface area.

Examples of the carbons include carbon blacks, graphites, black leads, activated carbons, carbon nanotubes, carbon nanofibers, carbon nanohorns and fullerenes. If the particle diameter of carbon is excessively small, the carbon cannot readily form an electron conductive path. If the particle diameter is excessively large, the fuel cell catalyst layer tends to reduce gas diffusion properties or the catalyst usage rate tends to be lowered. Therefore, the carbon particle diameter is preferably in the range of 10 to 1000 nm, and more preferably 10 to 100 nm.

When the electron conductive particles are formed of carbon, the mass ratio of the catalyst to the carbon (catalyst: electron conductive particles) is preferably 4:1 to 1000:1.

The conductive polymers are not particularly limited. Examples thereof include polyacetylene, poly-p-phenylene, polyaniline, polyalkylaniline, polypyrrole, polythiophene, polyindole, poly-1,5-diaminoanthraquinone, polyaminodiphenyl, poly(o-phenylenediamine), poly(quinolinium) salt, polypyridine, polyquinoxaline and polyphenylquinoxaline. Of these, polypyrrole, polyaniline and polythiophene are preferred, and polypyrrole is more preferred.

The fuel cell catalyst layer may further contain a common polymer electrolyte used in fuel cell catalyst layers without limitation. Specific examples include perfluorocarbon polymers having a sulfonic acid group (such as NAFION (registered trade mark) (a 5% NAFION (registered trade mark) solution (DE521) manufactured by DuPont), hydrocarbon polymer compounds having a sulfonic acid group, polymer compounds doped with inorganic acids such as phosphoric acid, organic/inorganic hybrid polymers partially substituted with proton conductive functional groups, and proton conductors composed of a polymer matrix impregnated with a phosphoric acid solution or a sulfuric acid aqueous solution. Of these, NAFION (registered trade mark) (a 5% NAFION (registered trade mark) solution (DE521) manufactured by DuPont) is preferable.

The fuel cell catalyst layers of the present invention may be used as anode catalyst layers or cathode catalyst layers. The fuel cell catalyst layers of the present invention contain the catalyst that has high oxygen reducing activity and is resistant to corrosion in acidic electrolytes at high potential. Accordingly, the catalyst layers of the present invention are suited for use in fuel cell cathodes (as cathode catalyst layers). In particular, the catalyst layers are suitably provided in cathodes of membrane electrode assemblies in polymer electrolyte fuel cells.

The catalyst may be dispersed on the electron conductive particles as supports by methods such as airborne dispersion methods and in-liquid dispersion methods. The in-liquid dispersion methods are preferable because a dispersion of the catalyst and the electron conductive particles in a solvent can be used in the step for forming a fuel cell catalyst layer. Exemplary in-liquid dispersion methods include an orifice-choked flow method, a rotational shear flow method and an ultrasonic method. The solvents used in the in-liquid dispersion methods are not particularly limited as long as the catalysts or the electron conductive particles are not corroded and are dispersed therein. Volatile liquid organic solvents and water are generally used.

When the fuel cell catalyst is dispersed on the electron conductive particles, the electrolyte described above and a dispersant may be dispersed together.

The fuel cell catalyst layers may be formed by any methods without limitation. For example, a suspension containing the catalyst, the electron conductive particles and the electrolyte may be applied to an electrolyte membrane or a gas diffusion layer as described later. The application methods include dipping, screen printing, roll coating and spraying. In another embodiment, a suspension containing the catalyst, the electron conductive particles and the electrolyte may be applied or filtered on a substrate to form a fuel cell catalyst layer, and the catalyst layer may be transferred to an electrolyte membrane.

Electrodes of the present invention comprise the fuel cell catalyst layer and a porous support layer.

The electrodes of the present invention may be used as cathodes or anodes. The electrodes of the present invention have excellent durability and high catalytic performance, and hence are suitably used as cathodes, leading to high industrial advantage.

The porous support layer is a layer which diffuses gas (hereinafter, also the gas diffusion layer). The gas diffusion layers are not particularly limited as long as they have electron conductivity, high gas diffusion properties and high corrosion resistance. Carbon-based porous materials such as carbon paper and carbon cloth, and stainless steel and anticorrosive-coated aluminum foils for weight reduction are generally used.

Membrane electrode assemblies of the present invention have a cathode, an anode and an electrolyte membrane between the cathode and the anode. The cathode and/or the anode is the electrode as described hereinabove.

The electrolyte membranes may be generally perfluorosulfonic acid electrolyte membranes or hydrocarbon electrolyte membranes. Further, polymer fine-pore membranes impregnated with liquid electrolyte, or porous membranes filled with polymer electrolyte may be used.

Fuel cells of the present invention have the membrane electrode assemblies as described above.

The electrode reaction in fuel cells takes place at a so-called three-phase interface (electrolyte-electrode catalyst-reaction gas). The fuel cells are classified according to the electrolytes used, into several types such as molten carbonate fuel cells (MCFC), phosphoric acid fuel cells (PAFC), solid oxide fuel cells (SOFC) and polymer electrolyte fuel cells (PEFC). In particular, the membrane electrode assemblies of the present invention are preferably used in polymer electrolyte fuel cells.

EXAMPLES

The present invention will be described based on examples hereinbelow without limiting the scope of the present invention.

In Examples and Comparative Examples, measurements were carried out by the following methods.
[Analytical Methods]
1. Powder X-Ray Diffractometry Samples were analyzed by powder X-ray diffractometry using Rotaflex manufactured by Rigaku Corporation.
2. Elemental Analysis Carbon: Approximately 0.01 g of a sample was weighed out and analyzed with a carbon sulfur analyzer (EMIA-920V manufactured by HORIBA, Ltd.).

Nitrogen and oxygen: Approximately 0.01 g of a sample sealed in a Ni capsule was analyzed with an oxygen nitrogen analyzer (TC600 manufactured by LECO JAPAN CORPORATION).

Metals (niobium, titanium, iron, lanthanum, tantalum, zirconium): Approximately 0.1 g of a sample was weighed in a quartz beaker, and was completely thermal-decomposed using a sulfuric acid, a nitric acid and a hydrofluoric acid. This solution was cooled, and was collected to a volume of 100 mL, Then, this solution was appropriately diluted and quantitatively analyzed with ICP-OES (VISTA-PRO manufactured by SII) or with ICP-MS (HP7500 manufactured by Agilent)
3. BET Specific Surface Area Measurement BET specific surface area was measured using Micromeritics Gemini 2360 manufactured by Shimadzu Corporation.

Example 1

1. Preparation of Catalyst Material Before Grinding 5.88 g (56 mmol) of niobium carbide (NbC) and 5.14 g (48 mmol) of niobium nitride (NbN) were sufficiently mixed. This mixture was heated in nitrogen atmosphere at 1600° C. for 3 hours, thereby obtaining 10.82 g of a niobium carbonitride (1). This niobium carbonitride (1) was a sintered product, and thus was ground using a ball mill.

1.05 g of the niobium carbonitride (1) ground was heated at 900° C. for 4 hours in a tubular furnace while flowing thereto a nitrogen gas containing an oxygen gas of 1% by volume and a hydrogen gas of 1% by volume, thereby obtaining 1.19 g of a niobium-containing oxycarbonitride (hereinafter, also referred to as a "catalyst material before grinding (1)").

A powder X-ray diffraction spectrum of the catalyst material before grinding (1) is shown in FIG. 1. An elemental analysis result of the catalyst material before grinding (1) is shown in Table 1. The catalyst material before grinding (1) had a BET specific surface area of 3.1 m$^2$/g.
2. Grinding of Catalyst Material Before Grinding The catalyst material before grinding (1) was ground using a planetary ball mill (Premium 7 manufactured by Fritsch, rotation radius: 2.3 cm, orbital radius: 16.3 cm) in such a manner as described below.

Into a sealable zirconia mill container (volume: 45 mL, inner diameter: 45 mm), 0.9 g of the catalyst material before grinding (1), 40 g of a zirconia ball having a diameter of 0.5 mm (manufactured by Nikkato Corporation), and 7 mL of acetonitrile (a dispersion solvent) were introduced. The zirconia mill container was sealed, and the inside of the container was sufficiently replaced with argon. Then, the catalyst material before grinding (1) was ground under conditions of the number of rotation revolution: 700 rpm, the number of orbital revolution: 350 rpm, the rotating centrifugal acceleration: 12.6 G, the orbital centrifugal acceleration: 22.3 G, and the grinding time: 5 minutes, thereby obtaining a catalyst (1).

After the grinding, the zirconia mill container was water-cooled. After the water-cooling, the acetonitrile and the catalyst (1) were separated from the zirconia ball. Then, from the acetonitrile and the catalyst (1), by means of a rotary evaporator, the acetonitrile was removed, thereby collecting the catalyst (1). The catalyst (1) obtained had a BET specific surface area of 25 m$^2$/g. A powder X-ray diffraction spectrum of the catalyst (1) is shown in FIG. 2.

3. Measurement of Catalytic Performance

The catalytic performance (oxygen reducing activity) of the catalyst (1) obtained was measured in such a manner as described below.

(i) Production of Fuel Cell Electrode

The catalyst (1) in an amount of 0.095 g and carbon (XC-72 manufactured by Cabot Corporation) in an amount of 0.005 g were added to 10 g of a solution obtained by mixing isopropyl alcohol and pure water at a mass ratio between isopropyl alcohol and pure water of 2:1. The mixture was ultrasonically stirred to give a suspended mixture. 30 ma of this mixture was applied on a glassy carbon electrode (diameter: 5.2 mm, manufactured by Tokai Carbon Co., Ltd.) and was dried at 120° C. for 1 hour, thereby forming 1.0 mg or more of a fuel cell catalyst layer on the carbon electrode surface. Subsequently, 10 μl of NAFION (trade name) (a 5% NAFION (trade name) solution (DE521) manufactured by DuPont) diluted ten times with isopropyl alcohol was applied thereon and was dried at 120° C. for 1 hour. A fuel cell electrode (1) was thus manufactured.

(ii) Evaluation of Catalytic Performance (Oxygen Reducing Activity)

The fuel cell electrode (1) manufactured was polarized in a 0.5 mol/L sulfuric acid aqueous solution at 30° C. under an oxygen atmosphere and a nitrogen atmosphere at a potential scanning rate of 5 mV/sec, thereby measuring a current-potential curve. As a reference, a reversible hydrogen electrode was polarized in a sulfuric acid aqueous solution of the same concentration. The current-potential curve obtained in the above measurement is shown in FIG. 3.

From the result of the above measurement, a difference between the reduction current under oxygen atmosphere and the reduction current under nitrogen atmosphere at 0.7 V (vs. NHE) was calculated. The calculated value was divided by an area of the electrode to provide a value and this value was defined as the oxygen reduction current density (mA/cm$^2$). The higher this oxygen reduction current density is, the higher the catalytic performance (oxygen reducing activity) of the catalyst in the fuel cell electrode is.

The Catalytic performance (oxygen reducing activity), i.e., the oxygen reduction current density, of the catalyst (1) was 1.2 mA/cm$^2$. The oxygen reduction current density of the catalyst material before grinding (1) was 0.13 mA/cm$^2$.

Example 2

1. Grinding of Catalyst Material Before Grinding

The same procedure was carried out as in Example 1, except for using dichloroethane instead of acetonitrile as a dispersion solvent, thereby obtaining a catalyst (2). The catalyst (2) obtained had a BET specific surface area of 12 m$^2$/g.

2. Measurement of Catalytic Performance

The same procedure was carried out as in Example 1, except for using the catalyst (2) instead of the catalyst (1), thereby obtaining a fuel cell electrode (2), and the catalytic performance (oxygen reducing activity) was measured.

The catalytic performance (oxygen reducing activity), i.e., the oxygen reduction current density, of the catalyst (2) was 1.0 mA/cm$^2$.

Example 3

1. Grinding of Catalyst Material Before Grinding

The same procedure was carried out as in Example 1, except for using a zirconia ball having a diameter of 0.3 mm (manufactured by Nikkato Corporation) instead of the zirconia ball having a diameter of 0.5 mm (manufactured by Nikkato Corporation), thereby obtaining a catalyst (3). The catalyst (3) obtained had a BET specific surface area of 31 m$^2$/g.

2. Measurement of Catalytic Performance

The same procedure was carried out as in Example 1, except for using the catalyst (3) instead of the catalyst (1), thereby obtaining a fuel cell electrode (3), and the catalytic performance (oxygen reducing activity) was measured.

The catalytic performance (oxygen reducing activity), i.e., the oxygen reduction current density, of the catalyst (3) was 1.3 mA/cm$^2$.

Example 4

1. Preparation of Catalyst Material Before Grinding 5.88 g (56 mmol) of niobium carbide (NbC), 0.87 g (5 mmol) of iron acetate (Fe(CH$_3$COO)$_2$), and 5.14 g (48 mmol) of niobium nitride (NbN) were sufficiently mixed. This mixture was heated in nitrogen atmosphere at 1600° C. for 3 hours, thereby obtaining 10.89 g of a carbonitride (2) containing iron and niobium. A powder X-ray diffraction spectrum of the carbonitride (2) obtained is shown in FIG. 3. This carbonitride (2) was a sintered product, and thus was ground using a ball mill.

1.05 g of the carbonitride (2) ground was heated at 900° C. for 4 hours in a tubular furnace while flowing thereto a nitrogen gas containing an oxygen gas of 1% by volume and a hydrogen gas of 1% by volume, thereby obtaining 1.18 g of a oxycarbonitride containing iron and niobium (hereinafter, also referred to as a "catalyst material before grinding (2)"). An elemental analysis result of the catalyst material before grinding (2) is shown in Table 1. The catalyst material before grinding (2) had a BET specific surface area of 3.2 m$^2$/g.

The catalyst material before grinding (2) was observed using an SEM. Further, the catalyst material before grinding (2) was embedded into a resin and the cross section thereof was observed using a TEM. As a result, it was found that the catalyst material before grinding (2) contained a large number of voids, and the void ratio was 63%. The void was found to contain such a form as the aggregation of fine particles.

As a result of the elemental analysis, it was found that after the oxidizing step by heating, there was a decrease in the ratio of the number of carbon atoms and nitrogen atoms to the metal elements. It is considered from this that the oxidizing step by heating causes the carbon and nitrogen of the metal-containing carbonitride to be released as a gas to the outside of the system, and the foaming of these gases results in the generation of the voids in the resultant metal-containing oxycarbonitride.

1. Grinding of Catalyst Material Before Grinding

The same procedure was carried out as in Example 1, except for using the catalyst material before grinding (2) instead of the catalyst material before grinding (1), thereby obtaining a catalyst (4). The catalyst (4) obtained had a BET specific surface area of 29 m$^2$/g.

3. Measurement of Catalytic Performance

The same procedure was carried out as in Example 1, except for using the catalyst (4) instead of the catalyst (1), thereby obtaining a fuel cell electrode (4), and the catalytic performance (oxygen reducing activity) was measured.

The catalytic performance (oxygen reducing activity), i.e., the oxygen reduction current density, of the catalyst (4) was 1.8 mA/cm$^2$. The oxygen reduction current density of the catalyst material before grinding (2) was 0.51 mA/cm$^2$.

Example 5

1. Preparation of Catalyst Material Before Grinding 4 g (50 mmol) of titanium oxide (TiO$_2$) and 1.5 g (125 mmol) of a carbon black (XC-72 manufactured by Cabot Corporation) were sufficiently mixed. This mixture was heated in nitrogen atmosphere at 1700° C. for 3 hours, thereby obtaining 2.7 g of a titanium carbonitride (3). This titanium carbonitride (3) was a sintered product, and thus was ground using a ball mill.

1.0 g of the titanium carbonitride (3) ground was heated at 900° C. for 4 hours in a tubular furnace while flowing thereto a nitrogen gas containing an oxygen gas of 1% by volume and a hydrogen gas of 1% by volume, thereby obtaining 1.19 g of a titanium-containing oxycarbonitride (hereinafter, also referred to as a "catalyst material before grinding (3)"). An elemental analysis result of the catalyst material before grinding (3) is shown in Table 1. The catalyst material before grinding (3) had a BET specific surface area of 4.1 m$^2$/g.

2. Grinding of Catalyst Material Before Grinding

The same procedure was carried out as in Example 1, except for using the catalyst material before grinding (3) instead of the catalyst material before grinding (1), thereby obtaining a catalyst (5). The catalyst (5) obtained had a BET specific surface area of 45 m$^2$/g.

2. Measurement of Catalytic Performance

The same procedure was carried out as in Example 1, except for using the catalyst (5) instead of the catalyst (1), thereby obtaining a fuel cell electrode (5), and the catalytic performance (oxygen reducing activity) was measured.

The catalytic performance (oxygen reducing activity), i.e., the oxygen reduction current density, of the catalyst (5) was 1.5 mA/cm$^2$. The oxygen reduction current density of the catalyst material before grinding (3) was 0.22 mA/cm$^2$.

Example 6

1. Preparation of Catalyst Material Before Grinding 4 g (50 mmol) of titanium oxide (TiO$_2$), 1.5 g (125 mmol) of a carbon black (XC-72 manufactured by Cabot Corporation), and 0.16 g (0.5 mmol) of lanthanum oxide were sufficiently mixed. This mixture was heated in nitrogen atmosphere at 1700° C. for 3 hours, thereby obtaining 2.7 g of a carbonitride containing titanium and lanthanum (4). This carbonitride (4) was a sintered product, and thus was ground using a ball mill.

1.0 g of the carbonitride (4) ground was heated at 900° C. for 4 hours in a tubular furnace while flowing thereto a nitrogen gas containing an oxygen gas of 1% by volume and a hydrogen gas of 1% by volume, thereby obtaining 1.18 g of an oxycarbonitride containing titanium and lanthanum (hereinafter, also referred to as a "catalyst material before grinding (4)").

A powder X-ray diffraction spectrum of the catalyst material before grinding (4) is shown in FIG. 4. An elemental analysis result of the catalyst material before grinding (4) is shown in Table 1. The catalyst material before grinding (4) had a BET specific surface area of 4.5 m$^2$/g.

2. Grinding of Catalyst Material Before Grinding

The same procedure was carried out as in Example 1, except for using the catalyst material before grinding (4) instead of the catalyst material before grinding (1), thereby obtaining a catalyst (6). The catalyst (6) obtained had a BET specific surface area of 49 m$^2$/g. A powder X-ray diffraction spectrum of the catalyst (6) is shown in FIG. 5.

3. Measurement of Catalytic Performance

The same procedure was carried out as in Example 1, except for using the catalyst (6) instead of the catalyst (1), thereby obtaining a fuel cell electrode (6), and the catalytic performance (oxygen reducing activity) was measured.

The catalytic performance (oxygen reducing activity), i.e., the oxygen reduction current density, of the catalyst (6) was 2.0 mA/cm$^2$. The oxygen reduction current density of the catalyst material before grinding (4) was 0.29 mA/cm$^2$.

Example 7

1. Preparation of Catalyst Material Before Grinding 4.42 g (10 mmol) of tantalum oxide (Ta$_2$O$_5$), and 0.60 g (50 mmol) of a carbon black (XC-72 manufactured by Cabot Corporation) were sufficiently mixed. This mixture was heated in nitrogen atmosphere at 1700° C. for 3 hours, thereby obtaining 2.7 g of a tantalum-containing carbonitride (5).

1.0 g of the carbonitride (5) ground was heated at 900° C. for 4 hours in a tubular furnace while flowing thereto a nitrogen gas containing an oxygen gas of 1% by volume and a hydrogen gas of 1% by volume, thereby obtaining 1.20 g of a tantalum-containing oxycarbonitride (hereinafter, also referred to as a "catalyst material before grinding (5)"). An elemental analysis result of the catalyst material before grinding (5) is shown in Table 1. The catalyst material before grinding (5) had a BET specific surface area of 1.9 m$^2$/g.

2. Grinding of Catalyst Material Before Grinding

The same procedure was carried out as in Example 1, except for using the catalyst material before grinding (5) instead of the catalyst material before grinding (1), thereby obtaining a catalyst (7). The catalyst (7) obtained had a BET specific surface area of 21 m$^2$/g.

2. Measurement of Catalytic Performance

The same procedure was carried out as in Example 1, except for using the catalyst (7) instead of the catalyst (1), thereby obtaining a fuel cell electrode (7), and the catalytic performance (oxygen reducing activity) was measured.

The catalytic performance (oxygen reducing activity), i.e., the oxygen reduction current density, of the catalyst (7) was 0.91 mA/cm$^2$. The oxygen reduction current density of the catalyst material before grinding (5) was 0.11 mA/cm$^2$.

Example 8

1. Preparation of Catalyst Material Before Grinding 6.1 g (50 mmol) of zirconium oxide (ZrO$_2$), and 1.5 g (125 mmol) of a carbon black (XC-72 manufactured by Cabot Corporation) were sufficiently mixed. This mixture was heated in nitrogen atmosphere at 1800° C. for 3 hours, thereby obtaining 4.0 g of a zirconium-containing carbonitride (6). This carbonitride (6) was a sintered product, and thus was ground using a ball mill.

1.0 g of the carbonitride (6) ground was heated at 900° C. for 4 hours in a tubular furnace while flowing thereto a nitrogen gas containing an oxygen gas of 1% by volume and a hydrogen gas of 1% by volume, thereby obtaining 1.17 g of a zirconium-containing oxycarbonitride (hereinafter, also referred to as a "catalyst material before grinding (6)"). An elemental analysis result of the catalyst material before grinding (6) is shown in Table 1. The catalyst material before grinding (6) had a BET specific surface area of 1.8 m²/g.

2. Grinding of Catalyst Material Before Grinding

The same procedure was carried out as in Example 1, except for using the catalyst material before grinding (6) instead of the catalyst material before grinding (1), thereby obtaining a catalyst (8). The catalyst (8) obtained had a BET specific surface area of 23 m²/g.

2. Measurement of Catalytic Performance

The same procedure was carried out as in Example 1, except for using the catalyst (8) instead of the catalyst (1), thereby obtaining a fuel cell electrode (8), and the catalytic performance (oxygen reducing activity) was measured.

The catalytic performance (oxygen reducing activity), i.e., the oxygen reduction current density, of the catalyst (8) was 0.77 mA/cm². The oxygen reduction current density of the catalyst material before grinding (6) was 0.12 mA/cm².

Example 9

1. Preparation of Catalyst Material Before Grinding 5 g (6 mmol) of iron (III) hexacyanoferrate (II) was heated in nitrogen atmosphere at 1600° C. for 3 hours, thereby obtaining 4.9 g of an iron-containing carbonitride (7). This carbonitride (7) was a sintered product, and thus was ground using a ball mill.

1.0 g of the carbonitride (7) ground was heated at 900° C. for 4 hours in a tubular furnace while flowing thereto a nitrogen gas containing an oxygen gas of 1% by volume and a hydrogen gas of 1% by volume, thereby obtaining 1.30 g of an iron-containing oxycarbonitride (hereinafter, also referred to as a "catalyst material before grinding (7)"). An elemental analysis result of the catalyst material before grinding (7) is shown in Table 1. The catalyst material before grinding (7) had a BET specific surface area of 2.0 m²/g.

2. Grinding of Catalyst Material Before Grinding

The same procedure was carried out as in Example 1, except for using the catalyst material before grinding (7) instead of the catalyst material before grinding (1), thereby obtaining a catalyst (9). The catalyst (9) obtained had a BET specific surface area of 41 m²/g.

3. Measurement of Catalytic Performance

The same procedure was carried out as in Example 1, except for using the catalyst (9) instead of the catalyst (1), thereby obtaining a fuel cell electrode (9), and the catalytic performance (oxygen reducing activity) was measured.

The catalytic performance (oxygen reducing activity), i.e., the oxygen reduction current density, of the catalyst (9) was 0.82 mA/cm². The oxygen reduction current density of the catalyst material before grinding (7) was 0.10 mA/cm².

Example 10

1. Grinding of Catalyst Material Before Grinding

The same procedure was carried out as in Example 1, except for using a pot type ball mill (AV-1 manufactured by ASH, rotation radius: 5 cm) instead of the planetary ball mill for the grinding, thereby obtaining a catalyst (10). The catalyst (10) obtained had a BET specific surface area of 18 m²/g. A XRD pattern of the catalyst (10) is shown in FIG. 6.

2. Measurement of Catalytic Performance

The same procedure was carried out as in Example 1, except for using the catalyst (10) instead of the catalyst (1), thereby obtaining a fuel cell electrode (10), and the catalytic performance (oxygen reducing activity) was measured.

The catalytic performance (oxygen reducing activity), i.e., the oxygen reduction current density, of the catalyst (10) was 0.96 mA/cm². A graph showing the oxygen reduction behavior of the fuel cell electrode (10) is shown in FIG. 7.

Comparative Example 1

The same procedure was carried out as in Example 1, except for using the catalyst material before grinding (1) instead of the catalyst (1), thereby obtaining a fuel cell electrode (10), and the catalytic performance (oxygen reducing activity) was measured.

The catalytic performance (oxygen reducing activity), i.e., the oxygen reduction current density, of the catalyst (10) was 0.13 mA/cm².

Comparative Example 2

1. Preparation of Catalyst Material Before Grinding 5.88 g (56 mmol) of niobium carbide (NbC) and 5.14 g (48 mmol) of niobium nitride (NbN) were sufficiently mixed. This mixture was heated in nitrogen atmosphere at 1600° C. for 3 hours, thereby obtaining 10.82 g of a niobium carbonitride (8). This niobium carbonitride (8) was a sintered product, and thus was ground using a ball mill.

1.05 g of the niobium carbonitride (8) ground was heated at 900° C. for 6 hours in a tubular furnace while flowing thereto a nitrogen gas containing an oxygen gas of 1% by volume and a hydrogen gas of 1% by volume, thereby obtaining 1.21 g of a niobium-containing oxycarbonitride (hereinafter, also referred to as a "catalyst material before grinding (8)"). An elemental analysis result of the catalyst material before grinding (8) is shown in Table 1. The catalyst material before grinding (8) had a BET specific surface area of 3.1 m²/g.

2. Grinding of Catalyst Material Before Grinding

The same procedure was carried out as in Example 1, except for using the catalyst material before grinding (8) instead of the catalyst material before grinding (1), thereby obtaining a catalyst (11). The catalyst (11) obtained had a BET specific surface area of 26 m²/g.

3. Measurement of Catalytic Performance

The same procedure was carried out as in Example 1, except for using the catalyst (11) instead of the catalyst (1), thereby obtaining a fuel cell electrode (11), and the catalytic performance (oxygen reducing activity) was measured.

The catalytic performance (oxygen reducing activity), i.e., the oxygen reduction current density, of the catalyst (11) was 0.25 mA/cm². The oxygen reduction current density of the catalyst material before grinding (8) was 0.31 mA/cm².

Comparative Example 3

1. Grinding of Catalyst Material Before Grinding

The same procedure was carried out as in Example 1, except for using a zirconia ball having a diameter of 0.05 mm (manufactured by Nikkato Corporation) instead of the zirconia ball having a diameter of 0.5 mm (manufactured by Nikkato Corporation), thereby obtaining a catalyst (12). The catalyst (12) obtained had a BET specific surface area of 29 m²/g.

2. Measurement of Catalytic Performance

The same procedure was carried out as in Example 1, except for using the catalyst (12) instead of the catalyst (1), thereby obtaining a fuel cell electrode (12), and the catalytic performance (oxygen reducing activity) was measured.

The catalytic performance (oxygen reducing activity), i.e., the oxygen reduction current density, of the catalyst (12) was 0.19 mA/cm².

Comparative Example 4

1. Grinding of Catalyst Material Before Grinding

The same procedure was carried out as in Example 1, except for changing the grinding time from 5 minutes to 60 minutes, thereby obtaining a catalyst (13). The catalyst (13) obtained had a BET specific surface area of 31 m²/g.

2. Measurement of Catalytic Performance

The same procedure was carried out as in Example 1, except for using the catalyst (13) instead of the catalyst (1), thereby obtaining a fuel cell electrode (13), and the catalytic performance (oxygen reducing activity) was measured.

The catalytic performance (oxygen reducing activity), i.e., the oxygen reduction current density, of the catalyst (13) was 0.03 mA/cm².

Comparative Example 5

1. Grinding of Catalyst Material Before Grinding

The same procedure was carried out as in Example 1, except for changing the number of rotation revolution from 700 rpm to 1100 rpm, changing the number of orbital revolution from 350 rpm to 550 rpm, changing the rotating centrifugal acceleration from 12.6 G to 31.1 G, and changing the orbital centrifugal acceleration from 22.3 G to 55.1 G, thereby obtaining a catalyst (14). The catalyst (14) obtained had a BET specific surface area of 30 m²/g.

2. Measurement of Catalytic Performance

The same procedure was carried out as in Example 1, except for using the catalyst (14) instead of the catalyst (1), thereby obtaining a fuel cell electrode (14), and the catalytic performance (oxygen reducing activity) was measured.

The catalytic performance (oxygen reducing activity), i.e., the oxygen reduction current density, of the catalyst (14) was 0.06 mA/cm².

Comparative Example 6

1. Grinding of Catalyst Material Before Grinding

The same procedure was carried out as in Example 1, except for using water instead of acetonitrile, thereby obtaining a catalyst (15). The catalyst (15) obtained had a BET specific surface area of 4.9 m²/g.

2. Measurement of Catalytic Performance

The same procedure was carried out as in Example 1, except for using the catalyst (15) instead of the catalyst (1), thereby obtaining a fuel cell electrode (15), and the catalytic performance (oxygen reducing activity) was measured.

The catalytic performance (oxygen reducing activity), i.e., the oxygen reduction current density, of the catalyst (15) was 0.01 mA/cm².

Comparative Example 7

1. Grinding of Catalyst Material Before Grinding

The same procedure was carried out as in Example 1, except for using ethanol instead of acetonitrile, thereby obtaining a catalyst (16). The catalyst (16) obtained had a BET specific surface area of 6.3 m²/g.

2. Measurement of Catalytic Performance

The same procedure was carried out as in Example 1, except for using the catalyst (16) instead of the catalyst (1), thereby obtaining a fuel cell electrode (16), and the catalytic performance (oxygen reducing activity) was measured.

The catalytic performance (oxygen reducing activity), i.e., the oxygen reduction current density, of the catalyst (16) was 0.24 mA/cm².

It was found from the results of Examples 1 to 10 and Comparative Examples 1 to 7 that grinding the specific catalyst material before grinding under specific conditions dramatically increased the catalytic performance (oxygen reducing activity) of the catalysts obtained after grinding.

TABLE 1

|  | Composition of catalyst material before grinding | Specific surface area before grinding (g/m²) | Activity before grinding (mA/cm²) | Dispersion solvent | Ball diameter (mm) |
|---|---|---|---|---|---|
| Ex. 1 | $NbC_{0.35}N_{0.17}O_{1.43}$ | 3.1 | 0.13 | acetonitrile | 0.5 |
| Ex. 2 | $NbC_{0.35}N_{0.17}O_{1.43}$ | 3.1 | 0.13 | dichloroethane | 0.5 |
| Ex. 3 | $NbC_{0.35}N_{0.17}O_{1.43}$ | 3.1 | 0.13 | acetonitrile | 0.3 |
| Ex. 4 | $Nb_{0.95}Fe_{0.05}C_{0.25}N_{0.14}O_{1.61}$ | 3.2 | 0.51 | acetonitrile | 0.5 |
| Ex. 5 | $TiC_{0.27}N_{0.14}O_{1.63}$ | 4.1 | 0.22 | acetonitrile | 0.5 |
| Ex. 6 | $Ti_{0.98}La_{0.02}C_{0.25}N_{0.14}O_{1.61}$ | 4.5 | 0.29 | acetonitrile | 0.5 |
| Ex. 7 | $TaC_{0.28}N_{0.15}O_{1.60}$ | 1.9 | 0.11 | acetonitrile | 0.5 |
| Ex. 8 | $ZrC_{0.27}N_{0.16}O_{1.49}$ | 1.8 | 0.12 | acetonitrile | 0.5 |
| Ex. 9 | $FeC_{0.26}N_{0.16}O_{1.55}$ | 2.0 | 0.10 | acetonitrile | 0.5 |
| Ex. 10 | $NbC_{0.35}N_{0.17}O_{1.44}$ | 3.1 | 0.13 | acetonitrile | 0.5 |
| Com. Ex. 1 | $NbC_{0.35}N_{0.17}O_{1.43}$ | 3.1 | 0.31 | — | — |
| Com. Ex. 2 | $NbC_{0.18}N_{0.03}O_{1.78}$ | 3.1 | 0.31 | acetonitrile | 0.5 |
| Com. Ex. 3 | $NbC_{0.35}N_{0.17}O_{1.43}$ | 3.1 | 0.31 | acetonitrile | 0.05 |
| Com. Ex. 4 | $NbC_{0.35}N_{0.17}O_{1.43}$ | 3.1 | 0.31 | acetonitrile | 0.5 |
| Com. Ex. 5 | $NbC_{0.35}N_{0.17}O_{1.43}$ | 3.1 | 0.31 | acetonitrile | 0.5 |
| Com. Ex. 6 | $NbC_{0.35}N_{0.17}O_{1.43}$ | 3.1 | 0.31 | water | 0.5 |
| Com. Ex. 7 | $NbC_{0.35}N_{0.17}O_{1.43}$ | 3.1 | 0.31 | ethanol | 0.5 |

|  | Grinding time (min) | Number of rotation revolution | Specific surface area after grinding (g/m²) | Activity after grinding (mA/cm²) | Orbital acceleration | Rotating acceleration |
|---|---|---|---|---|---|---|
| Ex. 1 | 5 | 700 | 25 | 1.2 | 22.3 | 12.6 |
| Ex. 2 | 5 | 700 | 12 | 1.0 | 22.3 | 12.6 |
| Ex. 3 | 5 | 700 | 31 | 1.3 | 22.3 | 12.6 |
| Ex. 4 | 5 | 700 | 29 | 1.8 | 22.3 | 12.6 |

TABLE 1-continued

| | | | | | | |
|---|---|---|---|---|---|---|
| Ex. 5 | 5 | 700 | 45 | 1.5 | 22.3 | 12.6 |
| Ex. 6 | 5 | 700 | 49 | 2.0 | 22.3 | 12.6 |
| Ex. 7 | 5 | 700 | 21 | 0.91 | 22.3 | 12.6 |
| Ex. 8 | 5 | 700 | 23 | 0.77 | 22.3 | 12.6 |
| Ex. 9 | 5 | 700 | 41 | 0.82 | 22.3 | 12.6 |
| Ex. 10 | 10 | 50 | 18 | 0.96 | — | 6.1 |
| Com. Ex. 1 | — | — | — | — | | |
| Com. Ex. 2 | 5 | 700 | 26 | 0.25 | 22.3 | 12.6 |
| Com. Ex. 3 | 5 | 700 | 29 | 0.19 | 22.3 | 12.6 |
| Com. Ex. 4 | 60 | 700 | 31 | 0.03 | 22.3 | 12.6 |
| Com. Ex. 5 | 5 | 1100 | 30 | 0.06 | 55.1 | 31.1 |
| Com. Ex. 6 | 5 | 700 | 4.9 | 0.01 | 22.3 | 12.6 |
| Com. Ex. 7 | 5 | 700 | 6.3 | 0.24 | 22.3 | 12.6 |

The invention claimed is:

1. A process for producing a fuel cell catalyst comprising a metal-containing oxycarbonitride, which process comprises a grinding step for grinding the metal-containing oxycarbonitride using a ball mill, wherein:
    the metal-containing oxycarbonitride is represented by a compositional formula $MC_xN_yO_z$, wherein x, y, z are each a proportion of the number of atoms, $0.2 \leq x \leq 0.5$, $0.05 \leq y \leq 0.5$, and $0.5 \leq z \leq 1.7$, and M is a metal atom;
    balls in the ball mill have a diameter of 0.1 to 1.0 mm;
    the grinding time using the ball mill is 1 to 45 minutes;
    the rotating centrifugal acceleration in grinding using the ball mill is 2 to 20 G;
    the grinding using the ball mill is carried out in such a state that the metal-containing oxycarbonitride is mixed with a solvent containing no oxygen atom in the molecule; and
    when the ball mill is a planetary ball mill, the orbital centrifugal acceleration is 5 to 50 G.

2. The production process according to claim 1, wherein the solvent containing no oxygen atom in the molecule is at least one solvent selected from the group consisting of acetonitrile, dichloroethane, n-hexane and cyclohexane.

3. The production process according to claim 1, wherein M is at least one kind selected from the group consisting of niobium, iron, titanium, lanthanum, tantalum, and zirconium.

4. The production process according to claim 1, wherein the metal-containing oxycarbonitride is obtained by heating a metal-containing carbonitride in an inert gas containing an oxygen gas.

5. A fuel cell catalyst obtainable by the production process according to claim 1.

6. A fuel cell catalyst layer comprising the fuel cell catalyst according to claim 5.

7. The fuel cell catalyst layer according to claim 6, which further comprises electron conductive particles.

8. An electrode comprising a fuel cell catalyst layer and a porous support layer, wherein the fuel cell catalyst layer is the fuel cell catalyst layer according to claim 6.

9. A membrane electrode assembly comprising a cathode, an anode and an electrolyte membrane interposed between the cathode and the anode, wherein the cathode and/or the anode is the electrode according to claim 8.

10. A fuel cell comprising the membrane electrode assembly according to claim 9.

11. A polymer electrolyte fuel cell comprising the membrane electrode assembly according to claim 9.

* * * * *